United States Patent
Bangalore Krishnamurthy

(10) Patent No.: US 11,228,527 B2
(45) Date of Patent: Jan. 18, 2022

(54) LOAD BALANCING BETWEEN EDGE SYSTEMS IN A HIGH AVAILABILITY EDGE SYSTEM PAIR

(71) Applicant: VMWARE, INC., Palo Alto, CA (US)

(72) Inventor: Sudheendra Bangalore Krishnamurthy, Bangalore (IN)

(73) Assignee: VMware, Inc., Palo Alto, CA (US)

(*) Notice: Subject to any disclaimer, the term of this patent is extended or adjusted under 35 U.S.C. 154(b) by 606 days.

(21) Appl. No.: 15/584,054

(22) Filed: May 2, 2017

(65) Prior Publication Data

US 2018/0176074 A1    Jun. 21, 2018

(30) Foreign Application Priority Data

Dec. 21, 2016 (IN) .............................. 201641043632

(51) Int. Cl.
*H04L 12/28* (2006.01)
*H04L 12/803* (2013.01)
*H04L 12/26* (2006.01)
*H04L 12/703* (2013.01)

(52) U.S. Cl.
CPC ........ *H04L 47/125* (2013.01); *H04L 43/0817* (2013.01); *H04L 45/28* (2013.01)

(58) Field of Classification Search
CPC . H04L 12/24; H04L 12/2854; H04L 12/4641; H04L 41/0668
See application file for complete search history.

(56) References Cited

U.S. PATENT DOCUMENTS

| | | | | |
|---|---|---|---|---|
| 2012/0250516 A1* | 10/2012 | Aggarwal | ............... | H04L 45/22 370/238 |
| 2013/0170435 A1* | 7/2013 | Dinan | ..................... | H04L 45/50 370/328 |
| 2014/0280969 A1* | 9/2014 | Wood | ..................... | H04L 67/02 709/226 |
| 2016/0119229 A1* | 4/2016 | Zhou | ................... | H04L 12/4633 370/392 |

* cited by examiner

*Primary Examiner* — Wei Zhao

(57) ABSTRACT

The technology disclosed herein enables load balancing between a pair of virtual edge systems configured for high availability at an edge of a local network environment. In a particular embodiment, a method provides assigning a virtual network address to the pair of virtual edge systems. The method further provides generating state information used by one or more stateful functions of a first virtual edge system of the pair of virtual edge systems and transferring the state information to a second virtual edge system of the pair of virtual edge systems. Also, the method provides directing a first portion of network traffic to the first virtual edge system and a second portion of the network traffic to the second virtual edge system. The network traffic comprises packets addressed with the virtual network address.

20 Claims, 7 Drawing Sheets

LOAD BALANCING BETWEEN EDGE SYSTEMS IN A HIGH AVAILABILITY EDGE SYSTEM PAIR

Benefit is claimed under 35 U.S.C. 119(a)-(d) to Foreign Application Serial No. 201641043632 filed in India entitled "LOAD BALANCING BETWEEN EDGE SYSTEMS IN A HIGH AVAILABILITY EDGE SYSTEM PAIR", on Dec. 21, 2016, by VMware, Inc., which is herein incorporated in its entirety by reference for all purposes.

TECHNICAL BACKGROUND

High availability for a computing system provides a failover computing system should the primary computing system become unable to perform as needed. The failover computing system is configured to operate in the same manner as the primary computing system so that little to no impact will be felt due to the transfer of duties from the primary system to the failover system. In some cases, more than one potential failover system may be provided to increase redundancy and lessen the likelihood of complete system failure. Typically, a failover computing system will continually be updated as to die status of the primary computing system. For example, the primary computing system may periodically send "heartbeat" messages to the failover system to indicate that the primary computing system is functioning properly. Should those heartbeat messages stop, the failover computing system takes over duties from the primary computing system.

While there are situations where the failover system may be dormant, which will require time to come out of that state when called upon, high availability cases require the failover system to take over duties from the primary system immediately to ensure no gaps in service occur. In those cases, the failover system must be powered on and consuming resources even though there is no guarantee about when or if it will ever be called upon. This is true even if the failover system is implemented as a virtual element executing on a host computing system. While the host system may still need to be powered on for other processes that may be executing thereon, maintaining an operational failover system still consumes memory and processing resources that could otherwise be used for those other processes. Thus, the resources are effectively wasted while the failover system is waiting to take over for a primary system.

OVERVIEW

The technology disclosed herein enables load balancing between a pair of virtual edge systems configured for high availability at an edge of a local network environment. In a particular embodiment, a method provides assigning a virtual network address to the pair of virtual edge systems. The method further provides generating state information used by one or more stateful functions of a first virtual edge system of the pair of virtual edge systems and transferring the state information to a second virtual edge system of the pair of virtual edge systems. Also, the method provides directing a first portion of network traffic to the first virtual edge system and a second portion of the network traffic to the second virtual edge system. The network traffic comprises packets addressed with the virtual network address.

In some embodiments, upon determining that the first virtual edge system is unavailable, the method provides directing all the network traffic to the second virtual edge system.

In some embodiments, the method provides executing a state information daemon in the first virtual edge system and the second virtual edge system. The state information daemon controls the generation and exchange of the state information. In some cases, the state information daemon further synchronizes processing of network requests in the network traffic between the first virtual edge system and the second virtual edge system.

In some embodiments, all wide area network (WAN) traffic of the network traffic is directed through the first virtual edge system between a WAN and the local network environment.

In some embodiments, the second portion of the network traffic comprises traffic between local area networks (LANs) of the local network environment.

In some embodiments, the state information includes Transmission Control Protocol (TCP) connection information for a plurality of TCP connections between systems on a wide area network (WAN) and systems in the local network environment.

In some embodiments, the method provides applying network rules to the network traffic based on the virtual network address.

In some embodiments, the first virtual edge system is implemented on a host computing system different from a host computing system on which the second virtual edge system is implemented.

In some embodiments, the first virtual edge system is designated as a master edge system and the second virtual edge system is designated as a slave edge system.

In another embodiment, a system is provided having one or more computer readable storage media and a processing system operatively coupled with the one or more computer readable storage media. Program instructions stored on the one or more computer readable storage media, when read and executed by the processing system, direct the processing system to assign a virtual network address to the pair of virtual edge systems. The program instructions further direct the processing system to generate state information used by one or more stateful functions of a first virtual edge system of the pair of virtual edge systems and transfer the state information to a second virtual edge system of the pair of virtual edge systems. Also, the program instructions direct the processing system to direct a first portion of network traffic to the first virtual edge system and a second portion of the network traffic to the second virtual edge system. The network traffic comprises packets addressed with the virtual network address.

BRIEF DESCRIPTION OF THE DRAWINGS

The following description and associated figures teach the best mode of the invention. For the purpose of teaching inventive principles, some conventional aspects of the best mode may be simplified omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

As noted above, one system in a pair of high availability systems acts as a failover system but otherwise goes unused. When implemented as a virtual element in a virtual environment, the failover system still necessarily uses resources of a host computing system to remain highly available should the primary system fails. The embodiments center around a specific type of virtual element, a virtual edge system. A virtual edge system is logically located at the point of ingress/egress to a virtual network environment comprising a network of virtual elements hosted on physical host computing systems and physical networking devices. The virtual edge system manages traffic passing to and from the virtual network. For example, a firewall functionality may be implemented in the virtual edge system to prevent malicious, or otherwise unwanted, traffic from passing into the virtual network environment.

A failover virtual edge system in a high availability pair of edge systems needs to be kept up to date with the state of a primary virtual edge system in the pair. Otherwise, when the failover system takes over for the primary virtual edge system, stateful services performed by the primary virtual edge system cannot be performed in the same manner by the failover virtual edge system. For example, some firewall implementations are stateful services in that the processing of traffic relies upon information generated previously for the firewall (i.e., a prior state). A firewall in that type of example may, for instance, determine that traffic for a certain connection is allowable and generates state information indicating that fact. The failover virtual edge system would need to be aware of that state information in order to treat that traffic in the same manner.

The virtual edge systems herein share state information not only for failover purposes but also for load balancing of network traffic processing before any failure occurs. Rather than one virtual edge system in a high availability pair remaining idle until tapped to takeover for the other virtual edge system in the pair, that virtual edge system can be used to process at least some of the network traffic that otherwise would have been processed by the other virtual edge system. This arrangement is able to avoid the scenarios where one of the virtual edge systems from consumes resources while otherwise remains idle waiting for failover. Also, the arrangement should add to the efficiency of processing, network traffic since more than one virtual edge system is sharing the processing load.

Figure 1:
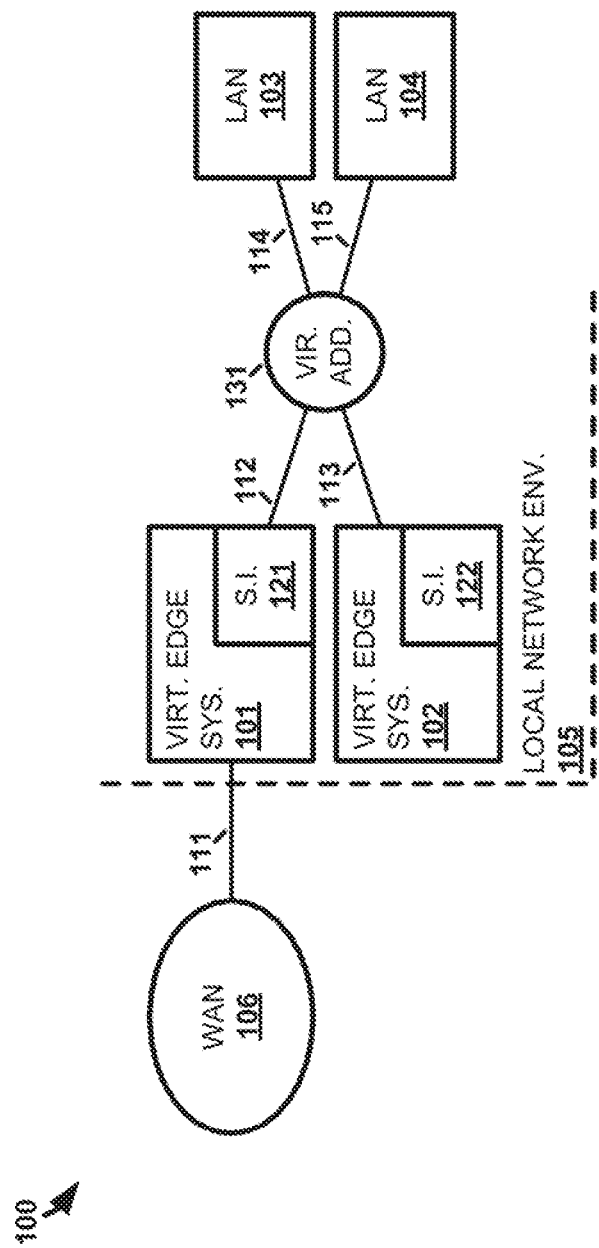
FIG. 1 illustrates a computing environment for load balancing between a pair of high availability edge systems.

FIG. 1 illustrates computing environment 100 for load balancing between a pair of high availability edge systems. Computing environment 100 includes virtual edge system 101, virtual edge, system 102, local area network (LAN) 103, LAN 104, and wide area network (WAN) 106. Elements 101-104 are part of local network environment 105 with virtual edge system 101 and virtual edge system 102 configured as a high availability virtual edge system pair through which communications to and from local network environment 105 pass. Communication links 111-115 comprise real and/or virtual communication links between elements 101-106.

Figure 2:
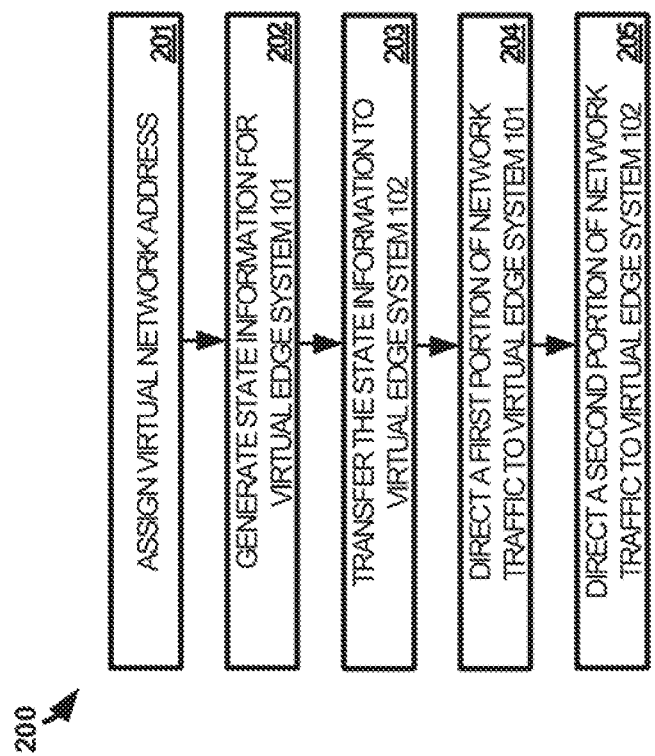
FIG. 2 illustrates a method of operating the computing environment to load balance between a pair of high availability edge systems.

FIG. 2 illustrates method 200 of operating computing environment 100 to load balance between a pair of high availability edge systems. As noted above, virtual edge system 101 and virtual edge system 102 are configured as a high availability pair of virtual edge systems rather than multiple distinct edge systems leading into and out of local network environment 105. It should be understood that, in other examples, more than one high availability virtual edge system pair may also be used for traffic exchanged with local network environment 105. Each of those additional high availability pairs could be configured in the same manner as virtual edge system 101 and virtual edge system 102, as described below. Since the processing of network traffic is load balanced between virtual edge system 101 and virtual edge system 102, each virtual edge system could effectively act as a failover for the other. That is, should one of the virtual edge systems fail, the other virtual edge system will take over complete network traffic processing duties.

Method 200 provides assigning virtual network address 131 to the pair of virtual edge systems (201). Each of virtual edge system 101 and virtual edge system 102 continue to be assigned a distinct network address but are addressable as a pair by elements within local network environment 105 using virtual network address 131. That is, virtual network address 131 allows virtual edge system 101 and virtual edge system 102 to be treated as a single virtual edge system by elements within local network environment 105. The nature of virtual systems being implemented on physical host systems through software mechanisms, such as hypervisors, allows those software mechanisms to route network traffic to systems associated with a virtual network address rather than the actual network address associated with those systems (e.g., the network addresses that would have to be used by systems outside of local network environment 105).

Method 200 further provides virtual edge system 101 generating state information 121 used by one or more stateful functions of virtual edge system 101 (202). As noted above, a common stateful function of an edge system is a firewall function but other functions that rely on state information may also exist in virtual edge system 101 and virtual edge system 102, such as a load balancing function between other pairs of virtual edge systems in environments having multiple pairs. State information 121 includes any information that would be needed by virtual edge system 102 to process network traffic with the same result as if virtual edge system 101 bad processed the network traffic. State information 121 may include connection identification information TCP handshake information), network addresses of network traffic that should be treated one way or another, application layer gateway session information, or any other type of information that may affect how an edge system processes packets of network traffic. After generating state information 121, method 200 provides virtual edge system 101 transferring state information 121 to virtual edge system 102 (203). State information 121 is then incorporated into state information 122 of virtual edge system 102 for use when virtual edge system 102 processes network traffic.

Once state information 121 has been shared, method 200 provides directing a first portion of network traffic directed to virtual network address 131 within local network environment 105 to virtual edge system 101 (204) and a second portion of the network traffic to virtual edge system 102 (205). As noted above, the software mechanism used to implement virtual edge system 101 and virtual edge system 102 is also able to control the routing network traffic addressed to those systems at virtual network address 131. The load balancing aspect may further be implemented in this software. As such, upon receiving a portion of network traffic directed to virtual network address 131 the software mechanism determines whether that portion of network traffic should be directed to virtual edge system 101 or virtual edge system 102. The load balancing determination may be based upon information received from virtual edge system 101 and virtual edge system 102 about their current load, based on a random or round-robin distribution, may be based on a complex load balancing algorithm, based on the type of network traffic, based on the source of the network traffic, based on a destination of the network traffic, or based on some other factor—including combinations thereof.

Additionally, computing environment 100 only shows a communication link between WAN 106 and virtual edge system 101. Since systems communicating with local network environment 105 over WAN 106 cannot use virtual network address 131 to address the high availability pair including virtual edge system 101 and virtual edge system 102, those systems need to address packets to (and receive packets from) the actual network address of either virtual edge system 101 or virtual edge system 102. In this case, virtual edge system 101 is that virtual edge system, although, virtual edge system 102 could just as easily been used instead. Thus, network traffic directed out to WAN 106 by way of virtual network address 131 will need to be routed to virtual edge system 101. In contrast, network traffic routed within local network environment 105, such as network traffic between LAN 103 and LAN 104, may be routed to either virtual edge system 101 or virtual edge system 102 using virtual network address 131.

Referring back to FIG. 1, virtual edge system 101 and virtual edge system 102 comprise network edge systems implemented as virtual machines, containers, or some other type of virtualized computing element, executing on one or more host computing systems. Preferably, to better provide high availability system redundancy, virtual edge system 101 and virtual edge system 102 are implemented on different host computing systems. The host computing systems include processing circuitry and network communication interfaces. The host computing systems may further include other components such as a user interface, router, server, data storage system, and power supply.

As noted above, virtual edge system 101 and virtual edge system 102 border and are included in local network environment 105. Local network environment 105 further includes LAN 103 and LAN 104. LAN 103 and LAN 104 may be include physical and/or virtual networking components along with physical and/or virtual computing systems that communicate over LAN 103 and LAN 104. Thus, in some examples, LAN 103 and LAN 104 may be implemented as virtual LANs (VLANs) or virtual extensible LANs (VXLANs).

Figure 3:
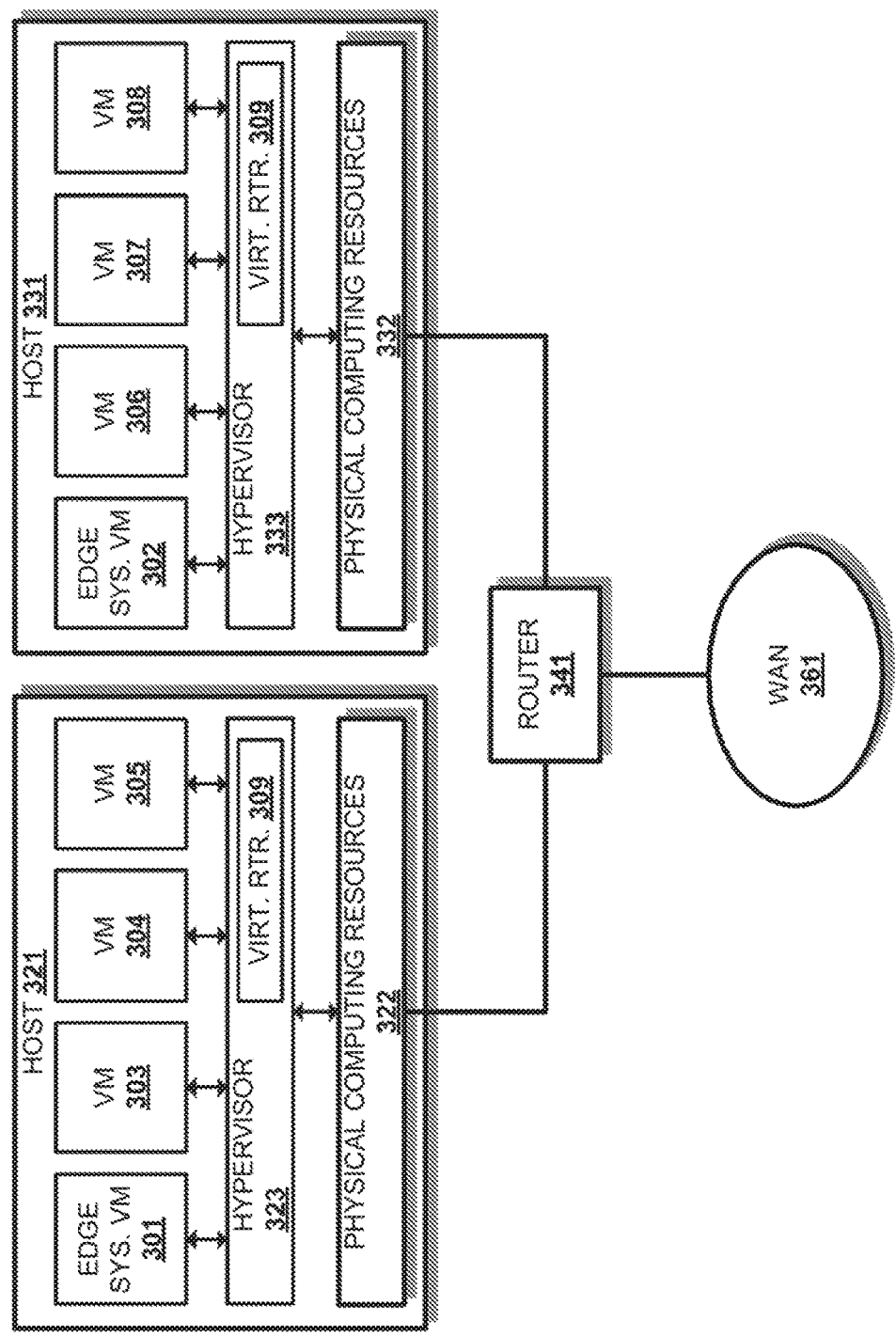
FIG. 3 illustrates another computing environment for load balancing between a pair of high availability edge systems.

FIG. 3 illustrates computing environment 300 for load balancing between a pair of high availability edge systems. Computing environment 300 includes host computing system 321, host computing system 331, communications router 341, and WAN 361. In this example, network router 341 comprises a layer 3 (network layer) router in the Open Systems interconnection model (OSI model) that routes communications to/from and between host computing systems 321 and 331. Network router 341 is further configured to exchange communications with other systems and devices over WAN 361. WAN 361 may include the Internet. While shown separately, network router 341 may be considered part of WAN 361 in some examples.

In this example, host computing system 321 executes hypervisor 323 to allocate physical computing resources 322 among virtual machines 301 and 303-305. Likewise, host computing system 331 executes hypervisor 333 to allocate physical computing resources 332 among virtual machines 302 and 306-308. Physical computing resources 322 and 332 may include processing resources (e.g., CPU time/cores), memory space, network interfaces, user interfaces, or any other type of resource that a physical computing system may include. At least network traffic exchanged between virtual machines 303-308 and WAN 361 will pass through one of edge system virtual machine 301 or edge system virtual machine 302 depending on which edge system is currently configured to process WAN traffic. An instance of a virtual router 309 is implemented in each of hypervisors 323 and 333. Virtual router 309 may comprise a distributed logical router (DLR) or may comprise some other component for routing communications between virtual machines.

It should be understood that the distribution of virtual machines even across two host computing systems, as shown in FIG. 3, is merely exemplary. The eight virtual machines shown may instead be implemented on any number of host computing systems from one to eight. Likewise, the host computing systems 321 and 331 could host additional virtual machines that are not involved in this example.

Figure 4:
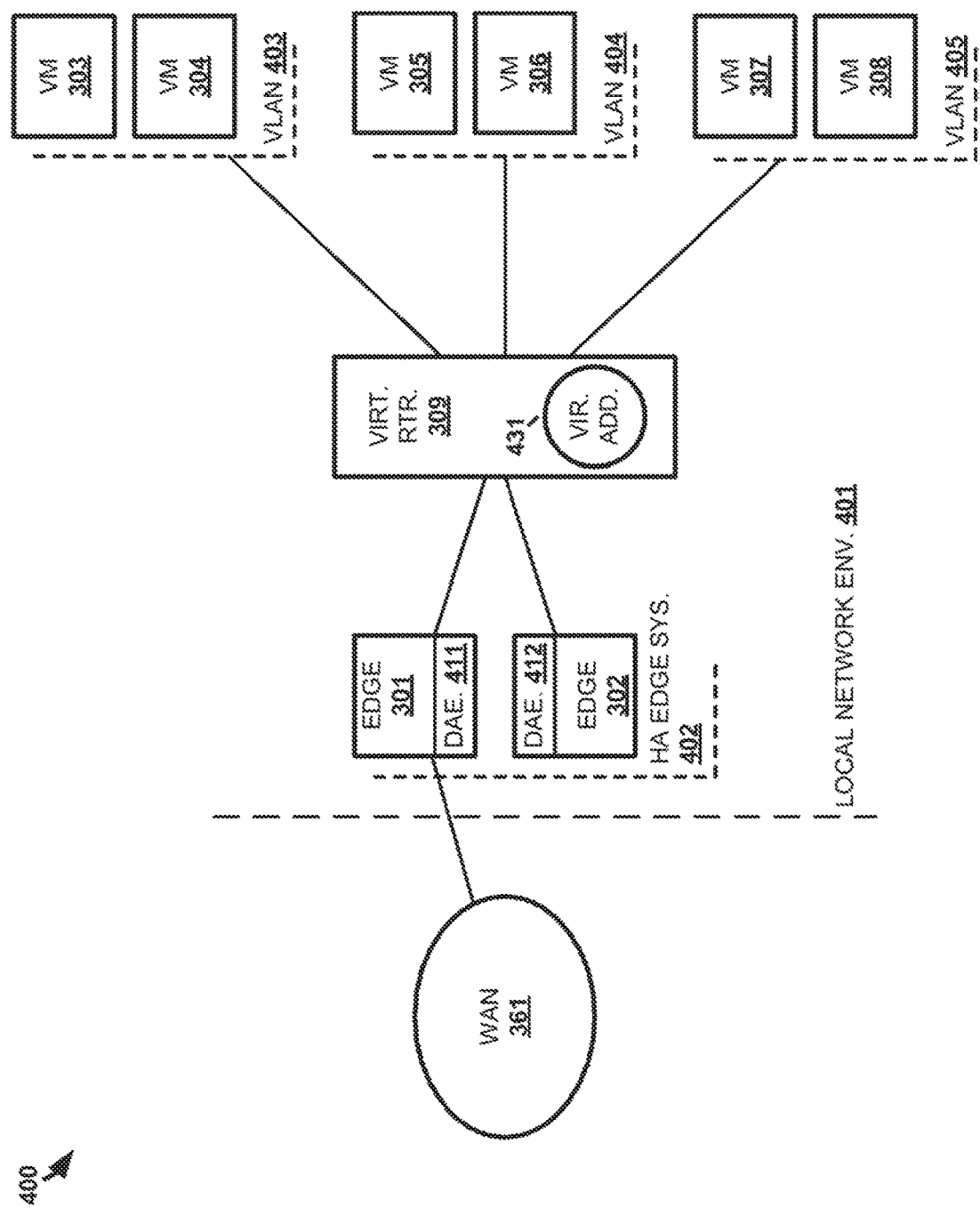
FIG. 4 illustrates a logical arrangement of the other computing environment to load balance between a pair of high availability edge systems.

FIG. 4 illustrates logical arrangement 400 of computing environment 300 to load balance between a pair of high availability edge systems. Specifically, logical arrangement 400 illustrates a network topology of virtual elements 301-308 as though virtual elements 301-308 were physical computing elements networked together. Because, as is the nature of virtual machines, the operating systems of virtual elements 301-308 run as though they are executing directly on physical computing systems with hypervisors 322 and 332 emulating computing resources, which allows virtual elements 301-308 to do so. In this example, edge system virtual machine 301 and edge system virtual machine 302 comprise high availability edge system pair 402 that processes network traffic between WAN 361 and elements within local network environment 401. Virtual IP address 431 is assigned to high availability edge system pair 402 for routing traffic to high availability edge system pair 402 independently of the specific edge system that receives the traffic. Within local network environment 401, virtual machine 303 and virtual machine 304 are in PLAN 403, virtual machine 305 and virtual machine 306 are in VLAN 404, and virtual machine 307 and virtual machine 308 are in VLAN 405. It should be understood that, in other examples, local network environment 401 could have any number of VLANs and those VLANs could include any number of virtual machines therein.

Virtual router 309 is shown as a router handling data communication traffic between high availability edge system pair 402 and VLANs 403-405. In some cases, virtual router 309 may further be configured to handle traffic between elements within VLANs 403-405. In some examples, virtual router 309 may be configured such that communications exchanged between elements on the same host computing system do not need to be routed out to network router 341. For instance, network traffic directed from virtual machine 303 to virtual machine 305 may simply be passed via hypervisor operations at the direction of virtual router 309. In contrast, network traffic directed from virtual machine 303 to virtual machine 307 would have to be sent to network router 341 for routing to host computing system 331. Regardless of the routing path, virtual router 309 routes network traffic between virtual machines 301-308 in a manner that is transparent to the operation of virtual machines 301-308.

In this example, edge system virtual machine 301 is executing state information daemon 411 and edge system virtual machine 302 is executing state information daemon 412. State information daemon 411 and state information daemon 412 handle the transfer of changes to the state information on edge system virtual machine 301 and edge system virtual machine 302, respectively. During load balancing of network traffic, state information changes may originate at either of edge system virtual machine 301 and edge system virtual machine 302. Therefore, state information daemon 411 and state information daemon 412 not only handle the transfer of state information updates but also the receipt and implementation of state information updates from the other edge system.

Figure 5:
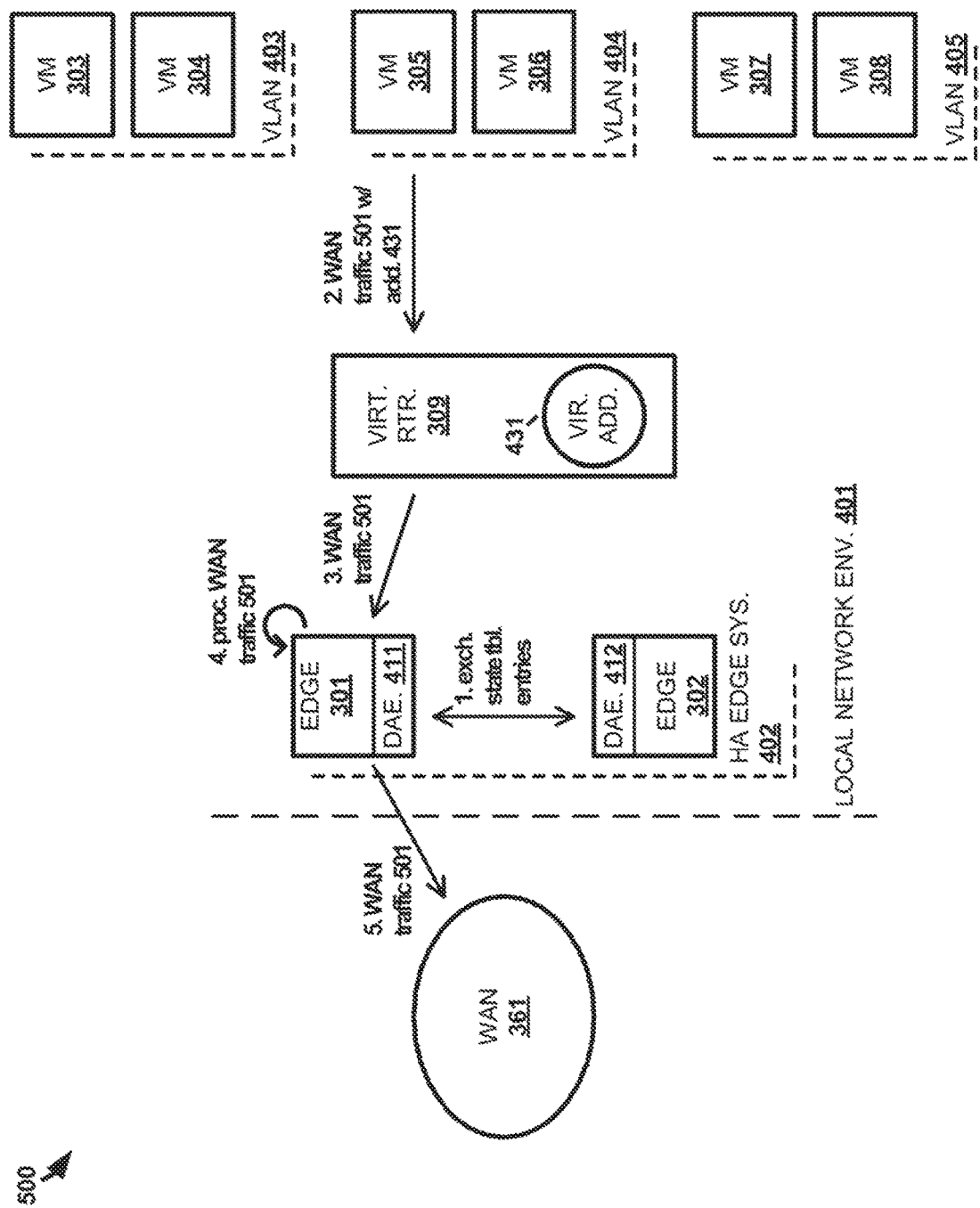
FIG. 5 illustrates an operational scenario of the other computing environment to load balance between a pair of high availability edge systems.

FIG. 5 illustrates operational scenario 500 of the other computing environment to load balance between a pair of high availability edge systems. Before operational scenario 500 begins, edge system virtual machine 301 and edge system virtual machine 302 are each assigned a distinct IP address as would typically be performed when addressable elements are added to a network or otherwise assigned a new IP address. Additionally, high availability edge system pair 402 is assigned virtual IP address 431. The addresses may be assigned by a user, by virtual router 309, by network router 341, or by some other element—including combinations thereof. Virtual IP address 431 allows edge system virtual machine 301 and edge system virtual machine 302 to be addressed as though, they are a single virtual edge system represented by high availability edge system pair 402. As such, all communication traffic within local network environment 401 that is directed through high availability edge system pair 402 will use virtual IP address 431 as opposed to edge system virtual machine 301 or edge system virtual machine 302's own IP address. Likewise, all network address translation (NAT) rules and firewall rules will be applied to virtual IP address 431, a Dynamic Host Configuration Protocol (DHCP) gateway address will be configured to use virtual IP address 431, virtual private networking will use virtual IP address 431, or any other type of function that would have otherwise relied on an edge system's own address will instead rely on virtual IP address 431.

Once high availability edge system pair 402 has been established, step 1 of operational scenario 500 provides that state information daemon 411 and state information daemon 412 can begin exchanging state information table entries between edge system virtual machine 301 and edge system virtual machine 302. State information daemon 411 and state information daemon 412 may exchange state information using a specially designed protocol for exchanging state information or may repurpose a communication protocol typically used for other purposes. The state information includes any information about network traffic connections that is generated once high availability edge system pair 402 begins processing network traffic. The state information itself may be stored in a state table maintained by edge system virtual machine 301 and edge system virtual machine 302. Entries of state information in those tables may include TCP handshake signal information (i.e., TCP SYN, SYN-ACK, and ACK message information) that identifies TCP connections and, consequently, the network traffic transferred via those connections. The state information may be exchanged periodically in accordance with a set interval, may be exchanged whenever a change, a certain type of change, or a group of changes is made to the state information, or on some other schedule. In some cases, state information daemon 411 and state information daemon 412 may further handle the exchange of heartbeat signals used to indicate when one of edge system virtual machine 301 and edge system virtual machine 302 is no longer operating so that the other can takeover.

At step 2, network traffic 501 destined for WAN 361 and addressed to virtual. IP address 431 is transferred from virtual machine 305. Upon receiving packets of WAN network traffic 501, virtual router 309 determines whether the packets should be routed to edge system virtual machine 301 or edge system virtual machine 302. In this example, edge system virtual machine 301 is the virtual edge system of high availability edge system pair 402 that is addressable from WAN 361 and is therefore designated the master virtual edge system of high availability edge system pair 402. Edge system virtual machine 302 is designated the slave virtual edge system of high availability edge system pair 402 since edge system virtual machine 302 does not communicate with WAN 361 while edge system virtual machine 301 is still operational. Accordingly, virtual router 309 determines that WAN network traffic 501 needs to be routed to edge system virtual machine 301 so that WAN network traffic 501 can be passed from edge system virtual machine 301 to WAN 361.

In accordance with the above determination, WAN network traffic 501 is passed to edge System virtual machine 301 at step 3 instead of edge system virtual machine 302. Edge system virtual machine 301 processes WAN network traffic 501 in accordance with any processing function implemented thereon at step 4. Assuming none of those functions cause WAN network traffic 501 to be denied passage through edge system virtual machine 301, WAN network traffic 501 is allowed to continue on to WAN 361 at step 5. Of course, in the above example, if edge system virtual machine 301 were to ever go down for any reason, a connection to WAN 361 would be established with edge system virtual machine 302 and edge system virtual machine 302 would take over as the master virtual edge system and handle all traffic directed to virtual IP address 431 on behalf of high availability edge system pair 402. Once edge system virtual machine 301 returns to operation, edge system virtual machine 302 may remain the master or a connection may be reestablished between edge system virtual machine 301 and WAN 361 so that edge system virtual machine 301 can reassume its role as master.

Figure 6:
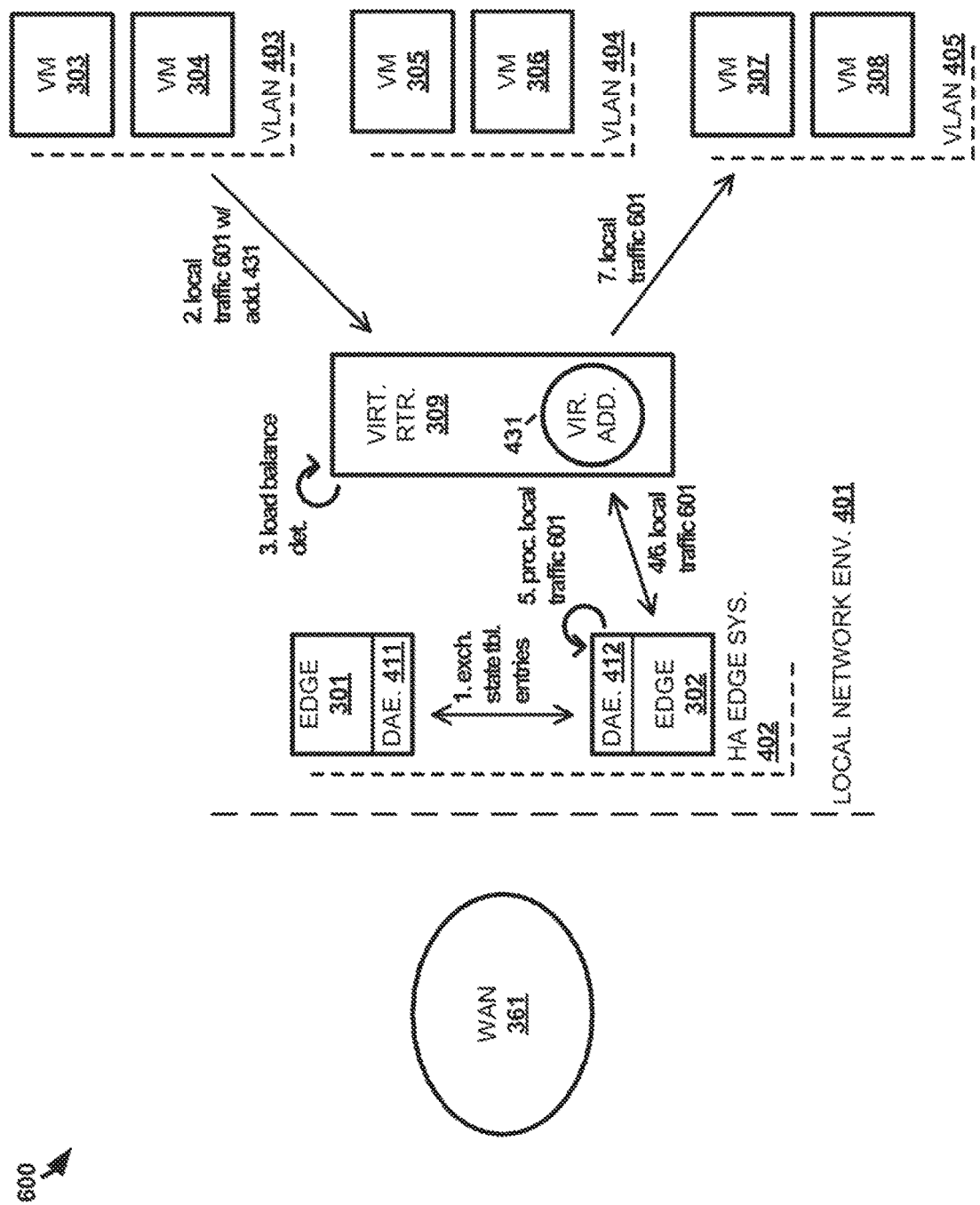
FIG. 6 illustrates another operational scenario of the other computing environment to load balance between a pair of high availability edge systems.

FIG. 6 illustrates operational scenario 600 of computing environment 300 to load balance between a pair of high availability edge systems. Operational scenario 600 is a continuation of operational scenario 500 to show how other non-WAN network traffic may be handled. Therefore, at step 1, state table entries continue to be exchanged between edge system virtual machine 301 and edge system virtual machine 302 by state information daemon 411 and state information daemon 412, respectively. In this example, virtual machine 304 is transferring data packets at step 2 to virtual machine 307 as local network traffic 601 addressed using virtual IP address 431.

Upon receipt of packets for local network traffic 601, virtual router 309 uses load balancing techniques to determine at step 3 which of edge system virtual machine 301 and edge system virtual machine 302 should handle local network traffic 501. Unlike in operational scenario 500, since local network traffic 601 is not directed towards WAN 361 either edge system virtual machine 301 or edge system virtual machine 302 can handle local network traffic 601. Virtual router 309 may use a round robin algorithm, an IP hash algorithm, information about current loads on edge system virtual machine 301 and edge system virtual machine 302 (e.g., the number of connections being handled by either), or any other type of technique for load balancing between two network elements.

In this example, virtual router 309 determines that edge system virtual machine 302 should handle edge system virtual machine 302 and routes local network traffic 601 to edge system virtual machine 302 accordingly at step 4. Upon receiving local network traffic 601, edge system virtual machine 302 processes the packets of local network traffic 601 at step 5. Assuming edge system virtual machine 302 does not find reason to deny passage to local network traffic 601, local network traffic 601 is transferred back to virtual router 309 at step 6, which then routes local, network traffic 601 to virtual machine 307 at step 7. Since state information is synchronized between edge system virtual machine 301 and edge system virtual machine 302, the above steps 4-7 would have been performed in exactly the same way by edge system virtual machine 301 had virtual router 309 decided to transfer local network traffic 601 to edge system virtual machine 301 instead.

Advantageously, operational scenario 500 and operational scenario 600 show how edge system virtual machine 302 is involved in the processing of network traffic rather than simply sitting idle as a failover system for edge system virtual machine 301. The use of virtual IP address 431 allows for network traffic to still be directed to a "single" virtual edge system while virtual router 309 reconciles virtual IP address 431 with one of the two possible virtual edge systems in high availability edge system pair 402.

Figure 7:
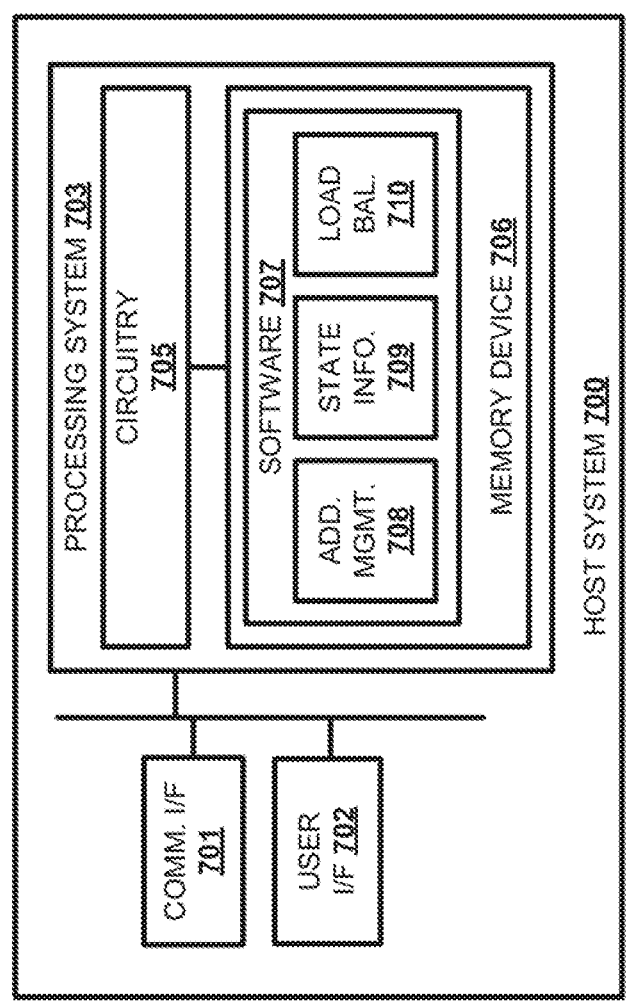
FIG. 7 illustrates a computing architecture used to load balance between a pair of high availability edge systems.

FIG. 7 illustrates a computing system 700 to load balance between a pair of high availability edge systems. Computing system 700 is representative of any computing system or systems with which the various operational architectures, processes, scenarios, and sequences disclosed herein load balance between a pair of high availability edge systems. Computing system 700 is an example of a computing system for implementing virtual edge systems 101 and 102 or virtual edge systems 301 and 302, although other examples may exist. Computing system 700 comprises communication interface 701, user interface 702, and processing system 703. Processing system 703 is linked to communication interface 701 and user interface 702. Processing system 703 includes processing circuitry 705 and memory device 706 that stores operating software 707. Computing system 700 may include other well-known components such as a battery and enclosure that are not shown for clarity.

Communication interface 701 comprises components that communicate over communication links, such as network cards, ports, radio frequency (RF), processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device, but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes address management module 708, state information module 709, and load balancing module 710, although any number of software modules within the application may provide the same operation. Operating software 707 may further include an operating system, utilities, drivers, network interfaces, applications, or some other type of software. When executed by processing circuitry 705, operating software 707 directs processing system 703 to operate computing system 700 as described herein.

In a particular example, address management module 708 directs processing system 703 to assign a virtual network address to a pair of virtual edge systems. State information module 709 directs processing system 703 to generate state information used by one or more stateful functions of a first virtual edge system of the pair of virtual edge systems and transfer the state information to a second virtual edge system of the pair of virtual edge systems. Load balancing module 710 directs processing system 703 to direct a first portion of network traffic to the first virtual edge system and a second portion of the network traffic to the second virtual edge system. The network traffic comprises packets addressed with the virtual network address.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of load balancing between a pair of virtual edge systems configured for high availability at an edge of a local network environment, the method comprising:
assigning a virtual network address to the pair of virtual edge systems, wherein the virtual network address is distinct from network addresses assigned to edge systems in the pair of virtual edge systems;
generating state information used by one or more stateful functions of a first virtual edge system of the pair of virtual edge systems;
transferring the state information to a second virtual edge system of the pair of virtual edge systems; and
in a virtual router, receiving network traffic and load balancing the pair of virtual edge systems by directing a first portion of the network traffic to the first virtual edge system and a second portion of the network traffic to the second virtual edge system, wherein the network traffic comprises packets addressed with the virtual network address.

2. The method of claim 1, further comprising:
upon determining that the first virtual edge system is unavailable, directing all subsequently received network traffic to the second virtual edge system.

3. The method of claim 1, further comprising:
executing a state information daemon in the first virtual edge system and the second virtual edge system, wherein the state information daemon controls the generation and exchange of the state information.

4. The method of claim 3, wherein the state information daemon further synchronizes processing of network requests in the network traffic between the first virtual edge system and the second virtual edge system.

5. The method of claim 1, wherein all wide area network (WAN) traffic of the network traffic is directed through the first virtual edge system between a WAN and the local network environment.

6. The method of claim 1, wherein the second portion of the network traffic comprises traffic between local area networks (LANs) of the local network environment.

7. The method of claim 1, wherein the state information includes Transmission Control Protocol (TCP) connection information for a plurality of TCP connections between systems on a wide area network (WAN) and systems in the local network environment.

8. The method of claim 1, further comprising:
applying network rules to the network traffic based on the virtual network address.

9. The method of claim 1, wherein the first virtual edge system is implemented on a host computing system different from a host computing system on which the second virtual edge system is implemented.

10. The method of claim 1, wherein the first virtual edge system is designated as a master edge system and the second virtual edge system is designated as a slave edge system.

11. A system for load balancing between a pair of virtual edge systems configured for high availability at an edge of a local network environment, the system comprising:
one or more computer readable storage media;
a processing system operatively coupled with the one or more computer readable storage media; and
program instructions stored on the one or more computer readable storage media that, when read and executed by the processing system, direct the processing system to:
assign a virtual network address to the pair of virtual edge systems, wherein the virtual network address is distinct from network addresses assigned to edge systems in the pair of virtual edge systems;
generate state information used by one or more stateful functions of a first virtual edge system of the pair of virtual edge systems;
transfer the state information to a second virtual edge system of the pair of virtual edge systems; and
in a virtual router, receive network traffic and direct a first portion of network traffic to the first virtual edge system and a second portion of the network traffic to the second virtual edge system to load balance the pair of virtual edge systems, wherein the network traffic comprises packets addressed with the virtual network address.

12. The system of claim 11, wherein the program instructions further direct the processing system to:
upon determining that the first virtual edge system is unavailable, direct all subsequently received network traffic to the second virtual edge system.

13. The system of claim 11, wherein the program instructions further direct the processing system to:
execute a state information daemon in the first virtual edge system and the second virtual edge system, wherein the state information daemon controls the generation and exchange of the state information.

14. The system of claim 13, wherein the state information daemon further synchronizes processing of network requests in the network traffic between the first virtual edge system and the second virtual edge system.

15. The system of claim 11, wherein all wide area network (WAN) traffic of the network traffic is directed through the first virtual edge system between a WAN and the local network environment.

16. The system of claim 11, wherein the second portion of the network traffic comprises traffic between local area networks (LANs) of the local network environment.

17. The system of claim 11, wherein the state information includes Transmission Control Protocol (TCP) connection information for a plurality of TCP connections between systems on a wide area network (WAN) and systems in the local network environment.

18. The system of claim 11, wherein the program instructions further direct the processing system to:
apply network rules to the network traffic based on the virtual network address.

19. The system of claim 11, wherein the first virtual edge system is implemented on a host computing system different from a host computing system on which the second virtual edge system is implemented.

20. The system of claim 11, wherein the first virtual edge system is designated as a master edge system and the second virtual edge system is designated as a slave edge system.

* * * * *